UNITED STATES PATENT OFFICE.

WALTHER ZACHARIAS, OF PITTSBURGH, PENNSYLVANIA.

CHLORIN DETINNING PROCESS.

1,283,016.　　　　　Specification of Letters Patent.　　Patented Oct. 29, 1918.

No Drawing.　　　Application filed June 24, 1915. Serial No. 36,137.

*To all whom it may concern:*

Be it known that I, WALTHER ZACHARIAS, a citizen of Germany, residing at 3720 Dawson street, in the city of Pittsburgh, in the county of Allegheny and State of Pennsylvania, have invented new and useful Improvements in Chlorin Detinning Processes.

It is well known to anybody who has to deal with chlorinating detinning processes that very often it occurs that the reaction after admitting chlorin to the receptacles, containing the material to be detinned, does not start readily.

Sometimes a considerable amount of chlorin, for instance, 300 or 400 or more pounds, may be admitted into these tanks without producing any effect.

In consequence, the concentration of the chlorin within the vessel might become relatively high. If the reaction starts now, then it can hardly be regulated so as to prevent the obnoxious formation of iron chlorid, the heat produced raising the temperature to the point where the iron also is attacked.

The concentration of the chlorin within the vessel then might have become relatively high. If then the reaction starts, hardly, if at all, this reaction can be regulated so as to prevent the formation of iron chlorid, the heat then being produced, raising the temperature to the point, where the iron is attacked.

No cooling device can overcome such troubles and the result is a considerable loss of chlorin as well as of the material to be treated. A still greater loss has to be met, because the iron chlorid, formed under such conditions, is of a very "fluffy" nature, which will retain a great part of the tetrachlorid of tin, this latter material being formed in such kind of detinning processes. This tetrachlorid is a tin salt of very high value, which under afore described conditions is practically lost. To recover this material would necessitate considerable costs in apparatus, which would make such part of the process unprofitable.

To these losses in chemicals there has to be added the loss in time and labor. After producing conditions which cause the chlorination of the iron, which is known in practical running such kind of processes as "hot spot", the vessel in which such an incident has happened, cannot be used till it has sufficiently cooled, so that the next admission of chlorin would not create another "hot spot".

Or an expensive arrangement has to be installed to withdraw the mixture of gases in a great hurry from the hot tank into another vessel, which said arrangement is not easy to be handled, and which will only partially do away with the losses afore mentioned. It even sometimes happens that the temperature, created in the first tank, is so high that by withdrawing the gaseous contents from this tank, so much heat is transferred into the second tank, that conditions are created therein, causing the operation, conducted in this vessel also to become a failure.

The causes for such accidents might come from different sources. To cause chlorin to attack tin without delay it is absolutely necessary that a temperature prevails within the tank, which in itself is no objection to the formation of tin tetrachlorid, that is: which is not too low.

In detinning plants it often has been found that in winter time after a shut down the whole running was inadequate, because the low temperature almost absolutely prevented the starting of the process. Even if a skilled "detinner" would be able to prevent losses of more serious kind by avoiding "hot spots", the loss of time in detinning, by allowing only smaller or better "limited" quantities of chlorin to enter the reaction chamber during the time unit, would be such as to make the economy of operating under such conditions at least very doubtful.

There might also be other conditions of important influence along the lines above explained. For instance, the detinning process might have come to a point, where the material treated in the tank, might have still 0.4%–0.5% tin left on the scrap. If now a breakdown or any other accident would cause an intermission of an hour or more, it is well known that it is very hard to restart such a cooled vessel, the reaction heat, which is necessary to come to a successful end, then being lost. If special means are not provided to heat the cooled tank, there is hardly any chance to recover all the tin from the treated material, which also would mean a detinned scrap which is not marketable at all.

The same unfavorable conditions like those I have described before, can be stated in some other phases of chlorin detinning processes.

For instance: if a tank filled with tin scrap, has shown all signs indicating that the tin has been entirely chlorinated, these signs being decreasing temperature and an increase of pressure and so on, then this tank still contains a quite considerable amount of free chlorin, which has to be made use of by allowing the gas to enter some other receptacle, which might be filled preferably with tin scrap. By this operation tetrachlorid of tin is also formed in this receptacle. This surplus of chlorin i. e.: the amount of gas which exceeds the theoretically needed amount to form tin tetrachlorid, might often amount to 500, 600 and more pounds, according to the charge of the tank, the dimensions of same and the kind of conducting the process. It is easily understood that, if such considerable quantities of chlorin are to be transformed into said chlorin compound, this has to be done very carefully. It nevertheless often occurs that such a concentration of chlorin gas is created in the second receptacle, before the reaction starts, that "hot spots" will happen with all their losses, troubles and delays.

Now I found by experiment and experience, that if the reaction between tin and chlorin does start in one spot, this reaction very quickly spreads over the whole bulk of the material.

The experiment was carried out as follows: In a white glass vessel of suitable capacity the bottom was covered with carefully dried tin scrap. It is understood that the air contained in said vessel was also absolutely dry. Then I admitted chlorin gas at the top of the receptacle, at the same time allowing the air to escape through some other opening. The white glass of the vessel allowed a very exact observation. Slowly the color of the gases within changed from colorless to yellow, but no reaction was started, which, according to theory, was to be expected. After the color within had turned to a deep yellow, indicating by this and by the amount of air which had escaped during this time, that the concentration of the chlorin gas was quite considerable, then the reaction started suddenly, first in one place and then rapidly spread over all the scrap contained in said vessel.

Starting from this experiment, I decided to overcome the aforedescribed troubles in adapting the experience, gained from this experiment, to the practical running in combining said experience with some other chemical reaction.

Tin in a form offering a comparatively large surface as for instance in a finely divided powder, or in the granulated form with sharp points and fins, and when rolled out into thin lamina, in either of which forms part of the tin can be assumed to exist in a finely divided state, is acted upon with great energy by chlorin gas; the reaction takes place even if the concentration of the chlorin is very low in comparison to the concentration of the chlorin in the above described cases. The resulting chlorin compounds are far more readily produced than under ordinary conditions, obviously due to the fact that a far greater number of tin molecules is exposed to the reaction of chlorin.

To overcome the aforedescribed troubles with all their disagreeable consequences like losses of tin, iron, tintetrachlorid and chlorin, delays in work while waiting for cooling, or extra expenditures of installing and running the necessary devices to oppose only part of said troubles, I provide the vessels, containing the tin scrap or the tin-bearing material with covered apertures or hoppers. These apertures are of such construction, that they allow an adding of chemicals to the interior of the tanks at any time of the process, carried out within, and are suitably arranged over the tanks. Their number and size has to suit the dimensions of the receptacle and the special conditions of the case in hand.

Through these apertures I add tin in very finely divided form, which according to the phase of the detinning process, is attacked by the chlorin either very shortly after the chlorin is admitted, or at once after the tin has been added, thereby starting, restarting, accelerating or maintaining the reaction between the chlorin and the tin on the material to be treated.

It is understood that the adding of tin in the above described form will usually be done before the detinning reagent is admitted. One way to execute this operation, would be to spread the tin powder in the containers while they are being filled with the scrap, but tin in its finely divided form can of course be added after and during the adding of the chlorin, this being done with the intention of starting, restarting or accelerating the process, maintaining the reaction temperature, raising the same and keeping it more uniform.

For instance: if in a tank the temperature is lowering, thus indicating that the process is nearing its end, there usually are some parts of the material, be it tin scrap or other tinbearing material, in said tank, which are not yet completely detinned, and which in most cases never will be completely detinned because the general conditions, resulting from decreasing temperature, then are as unfavorable as afore explained. On adding sufficient tin in finely divided form the temperature will rise again and thereby reëstablish favorable conditions, the result of which will be complete detinning.

If on account of an accident like a breakdown or shutdown or otherwise the reaction heat has been lost, an addition of tin as powder or in other finely divided state will soon create conditions within the tank such as to restart the reaction.

Furthermore my invention allows to remove or utilize the surplus of chlorin gas, which will always exist, when all indications show that the vessel is "done". This part of the process can be carried out either by sufficiently adding tin powder or the like to this vessel or by adding the tin powder to the second receptacle filled with tin scrap or other tinbearing material, into which said surplus is withdrawn, thereby starting the reaction in this second vessel from the very first beginning and avoiding the loss of costly time and disagreeable troubles.

It is of course understood that all metals, metal compounds or any other chemicals, which under similar conditions would act in the same mannner as tin in finely divided state, can be used for all afore described purposes. For instance, to produce a similar reaction, finely divided iron or precipitated copper or zinc may be used. Tin of course will be preferably used on account of its forming the same compound which results from chlorinating, detinning processes i. e.: tin tetrachlorid.

Having thus fully described this my invention, what I claim and desire to secure by Letters Patent is:

1. In a chlorinating detinning process the step of modifying the reaction temperature which consists in adding tin in a finely divided condition to the reaction chamber substantially as described.

2. In a chlorinating detinning process the step of modifying the reaction temperature which consists in adding metals in a finely divided condition to the reaction chamber substantially as described.

In witness whereof I have hereunto set my hand in the presence of the witnesses named below.

WALTHER ZACHARIAS.

Witnesses:
FRANK J. SCHMAUS,
JOHANNES BRAUN.

Copies of this patent may be obtained for five cents each, by addressing the "Commissioner of Patents, Washington, D. C."